(12) United States Patent
Castagnozzi et al.

(10) Patent No.: US 6,915,464 B1
(45) Date of Patent: Jul. 5, 2005

(54) SYSTEM AND METHOD FOR NON-CAUSAL CHANNEL EQUALIZATION USING ERROR STATISTIC DRIVEN THRESHOLDS

(75) Inventors: Daniel M. Castagnozzi, Lexington, MA (US); Warm Shaw Yuan, San Diego, CA (US); Keith Michael Conroy, Perkasie, PA (US); Omer Fatih Acikel, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 499 days.

(21) Appl. No.: 10/077,332

(22) Filed: Feb. 15, 2002

Related U.S. Application Data

(63) Continuation-in-part of application No. 10/020,426, filed on Dec. 7, 2001.

(51) Int. Cl.[7] ............................................. H03M 13/00
(52) U.S. Cl. .................. 714/709; 714/775; 714/780
(58) Field of Search ................................ 714/709, 775, 714/780

(56) References Cited

U.S. PATENT DOCUMENTS

| | | | | |
|---|---|---|---|---|
| 3,670,304 A | * | 6/1972 | Andresen et al. ............ | 714/709 |
| 5,057,946 A | * | 10/1991 | Sugiyama ..................... | 360/46 |
| 5,781,588 A | * | 7/1998 | Abe et al. ..................... | 375/334 |
| 6,188,737 B1 | | 2/2001 | Bruce et al. ................. | 375/355 |

* cited by examiner

Primary Examiner—Joseph D. Torres
(74) Attorney, Agent, or Firm—Law Office of Gerald Maliszewski; Gerald Maliszewski

(57) ABSTRACT

A system and a method are provided for non-causal channel equalization using error statistics. The method comprises: receiving a non-return to zero (NRZ) data stream input encoded with forward error correction (FEC); establishing a plurality of thresholds to generate a first bit estimate; comparing the first bit estimate in the data stream to a second bit value received prior to the first bit; comparing the first bit estimate to a third bit value received subsequent to the first bit; in response to the comparisons, determining the value of the first bit; FEC decoding the determined first bit value; and, using FEC error statistics to adjust the thresholds by evaluating the number of errors associated with a plurality of three-bit sequence combinations.

27 Claims, 7 Drawing Sheets

Fig. 1 *(PRIOR ART)*
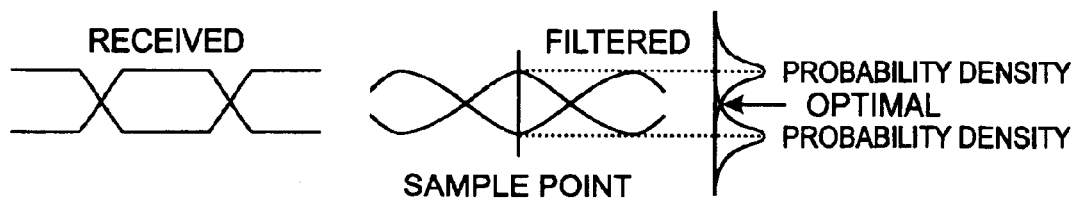
Fig. 2 *(PRIOR ART)*
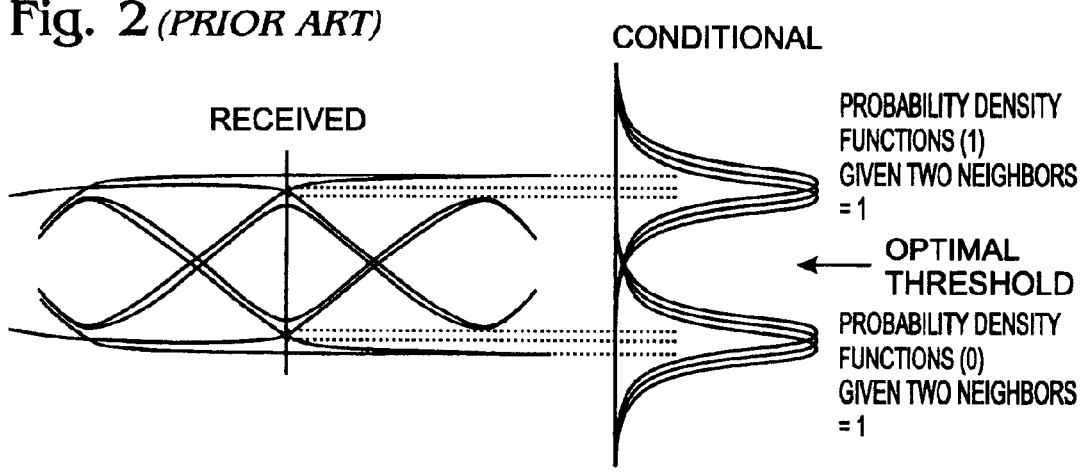
Fig. 3 *(PRIOR ART)*
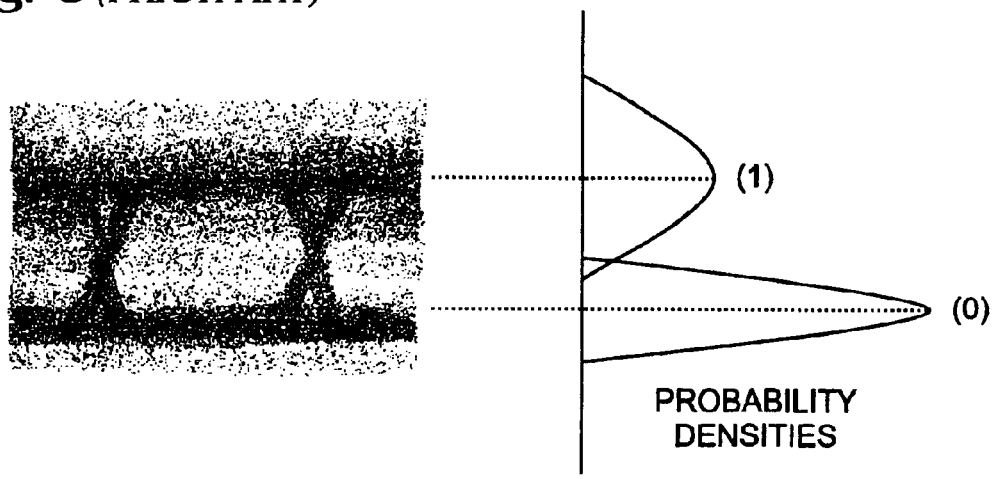

Fig. 5

NRZ DATA STREAM INPUTS $V_1$ — DEFINITE "1"

"0" IF BOTH 2ND AND 3RD BIT VALUE DECISIONS ARE "1"
"1" IF ONLY ONE OF THE 2ND AND 3RD BIT VALUE DECISIONS IS A "1"
"1" IF BOTH 2ND AND 3RD BIT VALUES ARE "0"

$V_{OPT}$

"1" IF BOTH 2ND AND 3RD BIT VALUE DECISIONS ARE "0"
"0" IF ONLY ONE OF THE 2ND AND 3RD BIT VALUE DECISIONS IS A "0"
"0" IF BOTH 2ND AND 3RD BIT VALUES ARE "1"

$V_0$ — DEFINITE "0"

Fig. 6

| BIT SEQUENCE | TOTAL ERRORS |
|---|---|
| 000 | 5 |
| 001 | 6 |
| 010 | 10 |
| 011 | 5 |
| 100 | 5 |
| 101 | 10 |
| 110 | 6 |
| 111 | 5 |

2ND BIT VALUE → 111 ← 3RD BIT VALUE
↑
1ST BIT VALUE

Fig. 7

| GROUP | SEQUENCES | THRESHOLD |
|---|---|---|
| 1 | 010 + 011 + 110 (OPTIONALLY 111) | $V_{OPT}$ |
| 2 | 000 + 001 + 100 (OPTIONALLY 101) | |
| 3 | 101 + 100 | $V_1$ |
| 4 | 2 x (111) | |
| 5 | 010 + 110 | $V_0$ |
| 6 | 2 x (000) | |
| 7 | 010 + 110 | $V_{OPT}$ |
| 8 | 101 + 100 | |

Fig. 9

| FIRST BIT ESTIMATE LINE 120A | 120B | 2ND BIT VALUE | 3RD BIT VALUE | 1ST BIT VALUE |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 1 |
| 0 | 1 | 0 | 1 | 0 |
| 0 | 1 | 1 | 0 | 0 |
| 0 | 1 | 1 | 1 | 0 |
| 1 | 0 | 0 | 0 | 1 |
| 1 | 0 | 0 | 1 | 1 |
| 1 | 0 | 1 | 0 | 1 |
| 1 | 0 | 1 | 1 | 0 |
| 1 | 1 | 0 | 0 | 1 |
| 1 | 1 | 0 | 1 | 1 |
| 1 | 1 | 1 | 0 | 1 |
| 1 | 1 | 1 | 1 | 1 |

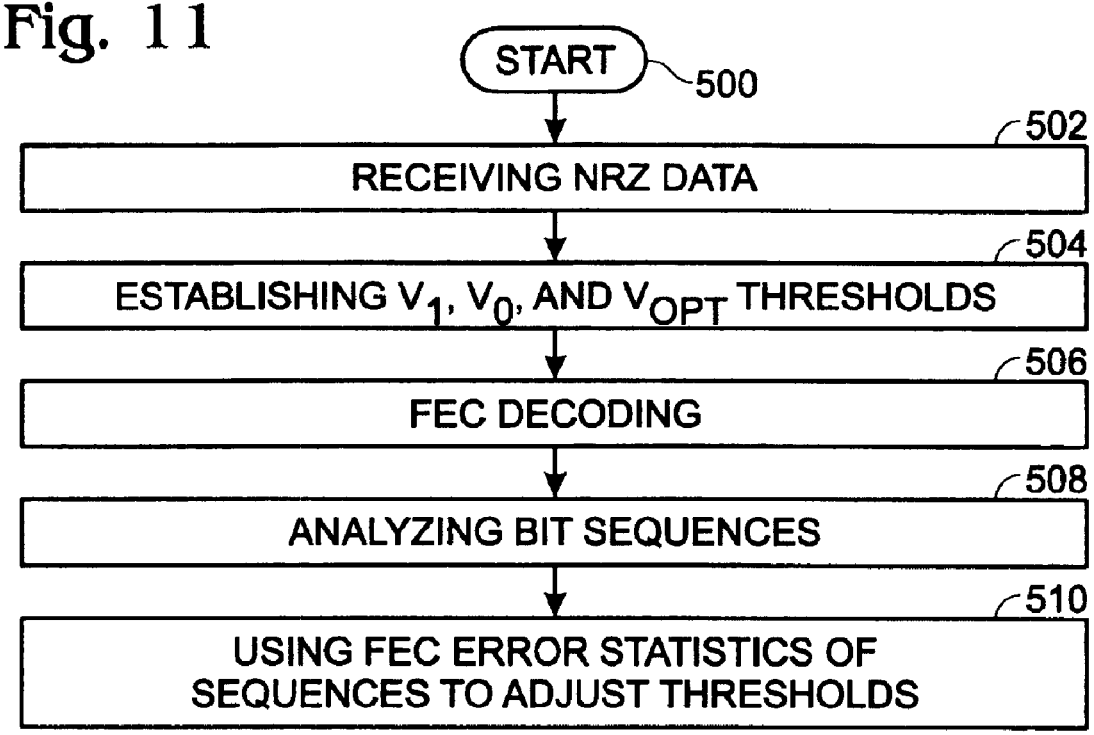

SYSTEM AND METHOD FOR NON-CAUSAL CHANNEL EQUALIZATION USING ERROR STATISTIC DRIVEN THRESHOLDS

RELATED APPLICATIONS

This application is a continuation-in-part of a pending application entitled, SYSTEM AND METHOD FOR NON-CAUSAL CHANNEL EQUALIZATION, invented by Castagnozzi et al., Ser. No. 10/020,426, filed Dec. 7, 2001.

This application is related to a pending application entitled, SYSTEM AND METHOD FOR NON-CAUSAL CHANNEL EQUALIZATION IN AN ASYMMETRICAL NOISE ENVIRONMENT, invented by Yuan et al., Ser. No. 10/066,966, filed Feb. 04, 2002.

BACKGROUND OF THE INVENTION

1. Field of the Invention

This invention generally relates to digital communications and, more particularly, to systems and methods for using forward error correction (FEC) error statistics to minimize the effects of inter-symbol interference in a non-return to zero (NRZ) data channel.

2. Description of the Related Art

FIG. 1 is a diagram illustrating a signal recovered from a binary symmetric, non-dispersive channel in the presence of symmetric noise (prior art). Conventionally, the signal is filtered with a transfer function matched to the signaling waveform (in this case a one unit step) and thresholded at the voltage level most likely to yield the transmitted bit. To recover the transmitted information, a hard decision must be made as to the value of the received bit.

As a function of the filtering process, and sometimes as a result of the transmission process, pulse spreading occurs. That is, the energy associated with a bit spreads to neighboring bits. For small degrees of spreading these effects of this can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one. For each of these cases the likelihood of error in determining a bit value can be minimized if a different thresholds are used for different bit combinations.

FIG. 2 is a diagram illustrating received waveforms that are distorted in response to the inter-symbol interference resulting from energy dispersion (prior art). The value at the output of the filter varies with each bit, and is essentially a random process, due to the non-deterministic nature of the information, and pseudorandom scrambling that is often used in the transmission of NRZ data streams. However, received bits can be characterized with probability density functions, as shown. Without knowledge of the neighboring bits, a single probability density function can be extracted that represents the random behavior of the input over all conditions and all sequences. However, conditional probability density functions can be defined for the three cases mentioned above. Namely, probability density functions can be defined for the cases where there are zero neighboring ones, only one neighboring one, and two neighboring ones.

If the bit value decision process could be made using the knowledge of the decision made on the preceding decoded bit, and with a measurement of a subsequent decoded bit, then the corresponding probability density function could be selected to make a more accurate decision on the current bit decision. However, the cost and accuracy of conventional analog-to-digital (AID) conversion circuits make such a solution impractical.

The degree of dispersion exhibited by a channel, and hence the separation of the conditional probability density functions, varies in response to a number of fixed and variable factors. Effective dispersion mitigation techniques must therefore be easily optimized to the channel and somewhat adaptive to changes in the channel due to aging, temperature changes, reconfiguration, and other possible influences.

The above-mentioned problems, in separating the conditional probability density functions of the three bit sequence scenarios, are exasperated when the noise distribution is not symmetric. That is, the energy distributions for "1" bits and "0" bits are different.

FIG. 3 is a diagram illustrating a signal recovered from a non-dispersive channel in the presence of asymmetric noise (prior art). There are differences in the shapes of the "1" and "0" probability density functions. Because of the overlap of the two functions, the values of thresholds are not necessarily the same as the values of thresholds in FIG. 1.

It would be advantageous if inter-symbol interference (ISI) caused by energy dispersion in a received NRZ data channel could be minimized.

It would be advantageous if the bit decision thresholds could be modified to take account of the dispersed energy in the neighboring bits in the NRZ data stream.

It would be advantageous if a record of FEC corrections could be used in a multi-thresholding bit decision scheme to account for the above-mentioned inter-symbol interference.

SUMMARY OF THE INVENTION

Many communication channels exhibit temporal spreading of the signaling waveform when propagating over long distances or over non-linear media. This phenomenon is not effectively addressed by traditional linear equalization techniques due to the non-causal nature of the impairment. A method is presented to reduce the effects of pulse spreading on hard-decision error rate in communication systems affected by this problem. The method utilizes multiple decision thresholds for each data bit. Post-processing of the multiple decision data is employed to reduce the data to a single hard decision per bit. The multiple data thresholds are adjusted for optimal mitigation of the -spreading effect.

The proposed approach to this problem is to perform multiple decisions on every bit with a threshold for each of the above-mentioned conditional probability density functions. The multiple decision data is stored for several bit times, to allow a calculation to be made on the succeeding bits. The decision is output from the device and fed-forward to be used in processing of subsequent bits. This calculation is then further refined following the FEC decoding of the data, and an analysis of a plurality of bit combinations, to select the optimum threshold values.

Accordingly, a method is provided for non-causal channel equalization using error statistics. The method comprises: receiving a non-return to zero (NRZ) data stream input encoded with forward error correction (FEC); establishing a plurality of thresholds to generate a first bit estimate; comparing the first bit estimate in the data stream to a second bit value received prior to the first bit; comparing the first bit estimate to a third bit value received subsequent to the first bit; in response to the comparisons, determining the value of the first bit; FEC decoding the determined first bit value; and, using FEC error statistics to adjust the thresholds by evaluating the number of errors associated with a plurality of three-bit sequence combinations.

The method further comprises: establishing a first threshold (V1) to distinguish a high probability "1" first bit estimate; establishing a second threshold (V0) to distinguish a high probability "0" first bit estimate; establishing a third threshold (Vopt) to distinguish first bit estimates between the first and second thresholds; supplying the first bit estimate for comparison in response to distinguishing the NRZ data stream input at the first, second, and third thresholds. Then, evaluating the number of errors associated with a plurality of three-bit combinations includes comparing the number of errors between different groups of three-bit sequences.

In one example, using FEC error statistics to adjust the thresholds includes: comparing the number of errors in a first group of three-bit sequences including 010, 011, and 110 to the number of errors in a second group of three-bit sequences including 000, 001, and 100; and, adjusting the third threshold to balance the number of errors between the first group of three-bit sequences and the second group of three-bit sequences. In some aspects, the first group of three-bit sequences additionally comprises 111 and the second group of three-bit sequences additionally comprises 101.

Likewise, FEC error statistics are used to adjust the first threshold by balancing the number of errors between a third group of three-bit sequences including 101 and 100 and the fourth group of three-bit sequences including 111, where the number of errors associated with the three-bit sequence 111 are doubled. FEC error statistics are used to adjust the second threshold by balancing the number of errors between a fifth group of three-bit sequences including 010 and 110 and the sixth group of three-bit sequences including 2×(000).

Additional details of the above-described method, and a non-causal channel equalization communication system using FEC error statistics are provided below.

BRIEF DESCRIPTION OF THE DRAWINGS

FIG. 1 is a diagram illustrating a signal recovered from a binary symmetric, non-dispersive channel in the presence of noise (prior art).

FIG. 2 is a diagram illustrating received waveforms that are distorted in response to the inter-symbol interference resulting from energy dispersion (prior art).

FIG. 3 is a diagram illustrating a signal recovered from a non-dispersive channel in the presence of asymmetric noise (prior art).

FIG. 5 is a graph illustrating the thresholds established by the multi-threshold circuit.

FIG. 6 is a diagram illustrating sequence combinations of the first, second, and third bits.

FIG. 7 is a summary diagram illustrating examples of bit sequence combinations cross-referenced to thresholds.

FIG. 9 is a diagram of the truth table associated with the non-causal circuit of FIG. 8.

FIG. 11 is a flowchart illustrating a different aspect of the non-causal channel equalization method of FIG. 10

DETAILED DESCRIPTION OF THE PREFERRED EMBODIMENTS

Figure 4:
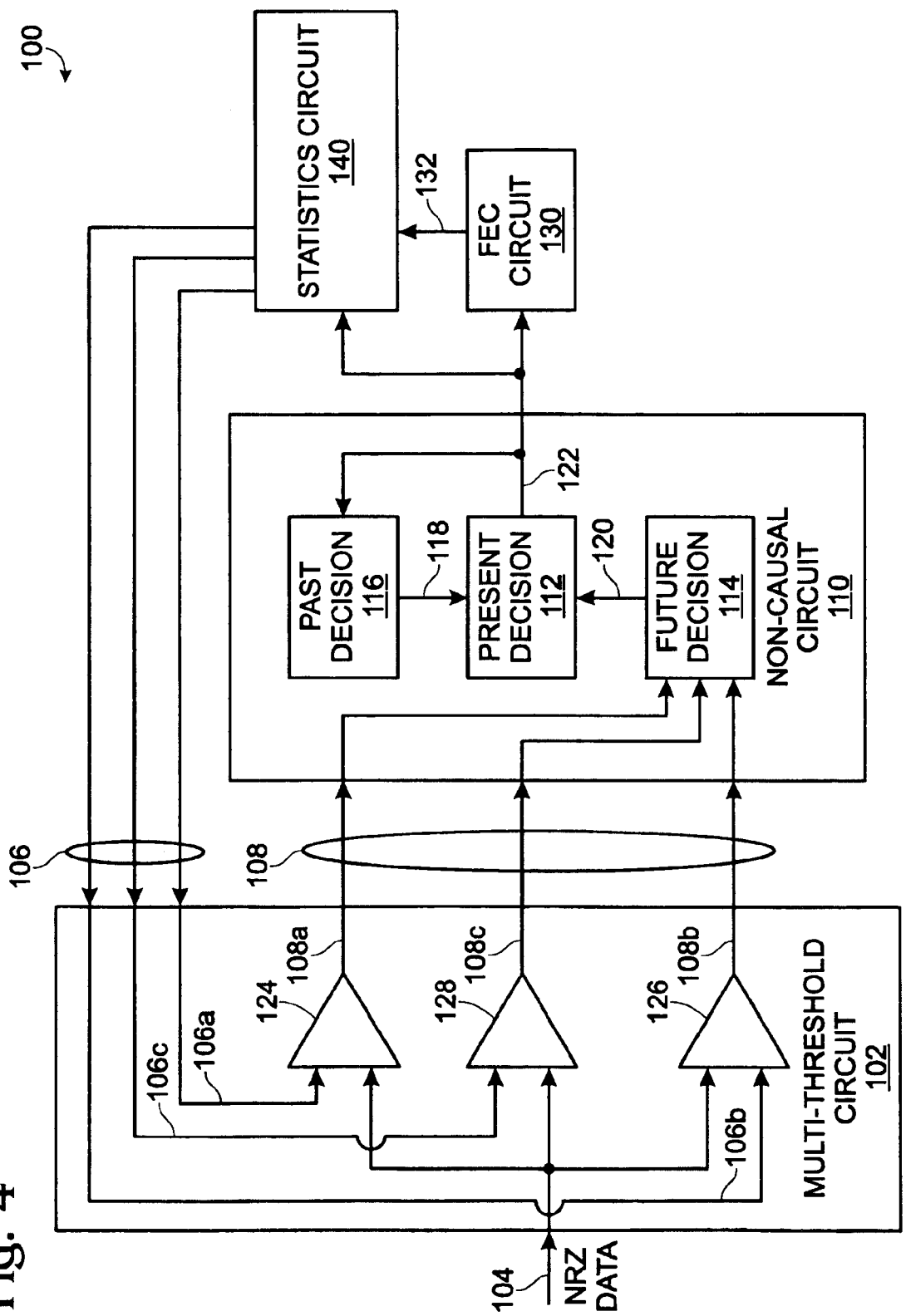
FIG. 4 is a schematic block diagram of the present invention non-causal channel equalization communication system using error statistics.

FIG. 4 is a schematic block diagram of the present invention non-causal channel equalization communication system using error statistics. The system 100 comprises a multi-threshold decision circuit 102 having an input on line 104 to accept a non-return to zero (NRZ) data stream, and an input on line 106 to accept threshold values. The multi-threshold decision circuit 102 has outputs on line 108 to provide bit estimates responsive to a plurality of voltage threshold levels. A non-causal circuit 110 has inputs on line 108 to accept the bit estimates from the multi-threshold decision circuit 102. The non-causal circuit 110 compares a current bit estimate (a first bit) to bit values decisions made across a plurality of clock cycles. The non-causal circuit 110 has an output to supply a bit value decision for the current bit estimate determined in response to the non-causal bit value comparisons.

The non-causal circuit 110 includes a present decision circuit 112, a future decision circuit 114, and a past decision circuit 116. The future decision circuit has inputs connected to the mutli-threshold circuit outputs on line 108. The future decision circuit 114 has outputs to supply the first bit estimate and the third bit value (as explained below). The present decision circuit 112 has inputs to accept the first bit estimate, the third bit value, and a second bit value from the past decision circuit 116. The present decision circuit 112 compares the first bit estimate in the data stream to the second bit value received prior to the first bit estimate, represented as being supplied from the past decision circuit 116 on line 118. The present decision circuit 112 also compares the first bit estimate to the third bit value received subsequent to the first bit estimate, represented as being from the future decision circuit 114 on line 120. The present decision circuit 112 has an output on line 122 to supply a first bit value determined in response to comparing the first bit estimates to the second and third bit values.

FIG. 5 is a graph illustrating the thresholds established by the multi-threshold circuit. The following discussion should be considered in light of both FIGS. 4 and 5. The multi-threshold circuit 102 includes a first comparator 124 having an input to accept the NRZ data stream on line 104, an input connected on line 106a to establish a first threshold (V1), and an output on line 108a to supply a signal distinguishing when the NRZ data stream input has a high probability of being a "1" bit value.

A second comparator 126 has an input on line 104 to accept the NRZ data stream, an input on line 106b to establish a second threshold (V0), and an output on line 108b to supply a signal distinguishing when NRZ data stream input has a high probability of being a "0" bit value. More literally, the second comparator 126 supplies a "0" when the NRZ data stream input on line 104 has a high probability of being a "0".

A third comparator 128 has an input on line 104 to accept the NRZ data stream, an input on line 106c to establish a third threshold (Vopt), and an output on line 108c to provide a signal when the NRZ data stream input has an approximately equal probability of being a "0" value as a "1" value. Distinguishing between a "1" and a "0" is a process that is aided by the non-causal circuit 110.

The multi-threshold circuit 102 and the non-causal circuit 110 work together perform a non-causal analysis. When the multi-threshold circuit 102 receives a NRZ data stream input below the third threshold (Vopt) and above the second threshold (VO), the present decision circuit (of the non-causal circuit 110) responds by supplying a (first) bit value of "1" on line 122, if both the second and third bit values are "0" on lines 118 and line 120, respectively. Otherwise, the present decision circuit 112 supplies a bit value of "0", if only one of the second and third bit values is a "0", or if both the second and third bit values are a "1". When the multi-threshold circuit 102 receives a NRZ data stream input above the third threshold and below the first threshold, the present decision circuit 112 responds by supplying a bit value decision of "0" if both the second and third bit values are "1". The present decision circuit 112 supplies a bit value decision of "1" if only one of the second and third bits is a "1" value, or if both the second and third bit values are a "0".

The multi-threshold circuit 102 accepts an NRZ data stream encoded with forward error correction (FEC). The system 100 further comprises a forward error correction (FEC) circuit 130 having an input on line 122 to receive the (first) bit values from the non-causal circuit 110. The FEC circuit 130 decodes the incoming data stream and corrects bit value in response to the decoding. The FEC circuit 130 has an output on line 132 to supply a stream of corrected data bits. As noted below, the data is not necessarily corrected in the received order, and delays may occur between the data on line 122 and the corrected data on line 132.

A statistics circuit has an input on line 122 to accept the first bit value from the non-causal circuit 110 and an input on line 132 to accept the stream of corrected data bits from the FEC circuit 130. The statistics circuit 140 has an output on line 106 to supply threshold values to the multi-threshold circuit 102 in response to analysis of the FEC error statistics. An analysis of FEC error statistics, as defined herein, includes a comparison of at least two different groups of bit sequences in arriving at a threshold value decision. More specifically, the statistics circuit has threshold outputs on lines 106a, 106b, and 106c corresponding to the first, second, and third threshold values, respectively. The statistics circuit 140 adjusts threshold values in response to evaluating the number of errors associated with a plurality of three-bit sequence combinations.

FIG. 6 is a diagram illustrating sequence combinations of the first, second, and third bits. As shown, there are a total of eight bit sequences using the three bits. The second bit value (the past) is followed by the first bit value (the present), which is followed by the third bit value (the future). The statistics circuit adjusts threshold values in response to comparing the number of errors between different groups of three-bit sequences, where the error is in the first bit value in the center of the sequence. As explained in more detail below, not all bit sequences are necessarily of interest in determining a particular threshold value.

For example, the statistics circuit compares the number of errors in a first group of three-bit sequences including 010, 011, and 110 to the number of errors in a second group of three-bit sequences including 000, 001, and 100. The statistics circuit adjusts the third threshold to balance the number of errors between the first group of three-bit sequences and the second group of three-bit sequences. That is, the errors associated with the sequence 010 are added to errors associated with 011 and 110 and compared to the total number of errors associated with the sequences 000 +001 +100. In some aspects of the system, the first group of three-bit sequences additionally comprises 111 and the second group of three-bit sequences additionally comprises 101.

Likewise, the statistics circuit adjusts the first threshold to balance the number of errors between a third group of three-bit sequences including 101 and 100 and the fourth group of three-bit sequences including 2×(111). That is, the statistics circuit doubles the number of errors associated with the sequence 111, and compares that number to the errors associated with the combination of sequences 101 +100.

The statistics circuit adjusts the second threshold to balance the number of errors between a fifth group of three-bit sequences including 010 and 110 and the sixth group of three-bit sequences including 2×(000). As above, the number of errors associated with the sequence 000 is doubled and compared to the total number of errors in the fifth group of sequences.

In another aspect of the system, the statistics circuit compares the number of errors in a seventh group of three-bit sequences including 010 and 110 to the number of errors in a eighth group of three-bit sequences including 101 and 100, and adjusts the third threshold to balance the number of errors between the seventh group of three-bit sequences and the eighth group of three-bit sequences.

FIG. 7 is a summary diagram illustrating examples of bit sequence combinations cross-referenced to thresholds.

Ideally, all of the bits in the three-bit sequences have been FEC corrected for maximum statistical reliability. However, the present invention system can be enabled with less than all the bits FEC corrected. Since the error analysis is concerned with the center bit of the three-bit sequences, the first bit value (the center bit) in the sequence is always FEC corrected. To increase processing rates, however, the second and third bit values need not necessarily be FEC corrected. For example, in some aspects of the system the comparison of the first through eight groups mentioned above, use just first (center) and second bit values that have been FEC corrected. In other aspects of the invention, the statistics circuit adjusts threshold values in response to comparing the number of errors between different groups of three-bit sequences, where the first (center) and third bit values have been FEC corrected. Another possibility is comparing three-bit sequences where just the first bit value (the center bit) has been FEC corrected. Alternately, groups of three-bit sequences can be differently corrected. For example, the first group of sequences can have first and second bits FEC corrected while the second group can have first and third bits FEC corrected. In another variation, different sequences inside a group can be differently corrected.

The use of FEC corrected bit values may be selective in order to increase processing rates, or due to particularities in the FEC decoding. For example, the FEC circuit may not sequentially decode the bit values in the order in which they are received. If the decoding occurs out of the received sequence, then the three-bit sequence analysis described above may occur before all the bit in the sequence have been decoded.

In some aspects of the system, the received information is a plurality of bit streams that are FEC encoded, and then interleaved as a protection against "bursty" type errors. One example of this format is the digital wrapper (DW) format. As part of this receiving process (not shown), the bit stream of received information on line 122 is deinterleaved before the plurality of bit streams can be FEC decoded. The FEC decoding of these deinterleaved bit streams is another circumstance where the present invention analysis of errors in various three-bit sequences may necessarily occur before all the bits in the sequence have been decoded.

Returning to FIG. 4, in some aspects of the system 100, the multi-threshold circuit 102 receives a NRZ data stream input with an asymmetric noise distribution (see FIG. 3). The statistics circuit analyzes error statistics to offset the threshold adjustments to account for the asymmetric noise distribution. That is, the process of balancing the number of errors associated with the above-mentioned bit sequence combination automatically acts to offset the threshold adjustments. The present invention system is equally adaptable for symmetrical and asymmetrical noise environments.

The first, second, and third thresholds are adjusted to minimize the number of errors being output by the present decision circuit on line 122. Because the NRZ input is pseudorandomly scrambled, the present decision circuit supplies approximately an equal number of "0" and "1" first bit values in response to establishing the first, second, and third thresholds in the first, second, and third threshold generators, respectively. However, the multi-threshold circuit output need not necessarily supply, nor the present decision circuit input need not necessarily accept an equal number of "0" and "1" bit estimates for this result to occur. The thresholding of the NRZ data input in an asymmetrical noise environment may result in a bias in the ratio between "1s" and "0s". In some aspects of the system, the present decision circuit operates to eliminate this bias.

In some aspects of the system, the multi-threshold circuit 102 receives a NRZ data stream input organized in frames, such as used in digital wrapper or synchronous optical network (SONET) protocols, and the statistics circuit 140 analyzes error statistics on a frame-by-frame basis. However, the present invention is not limited to any particular timing period. The error statistics may be accumulated in a long-term memory (not shown), or purged periodically, for example every frame. Further, the accumulation cycle need not be the same for the three thresholds. For example, Vopt may be redetermined every frame, while V1 and V0 are redetermined every ten frames.

Figure 8:
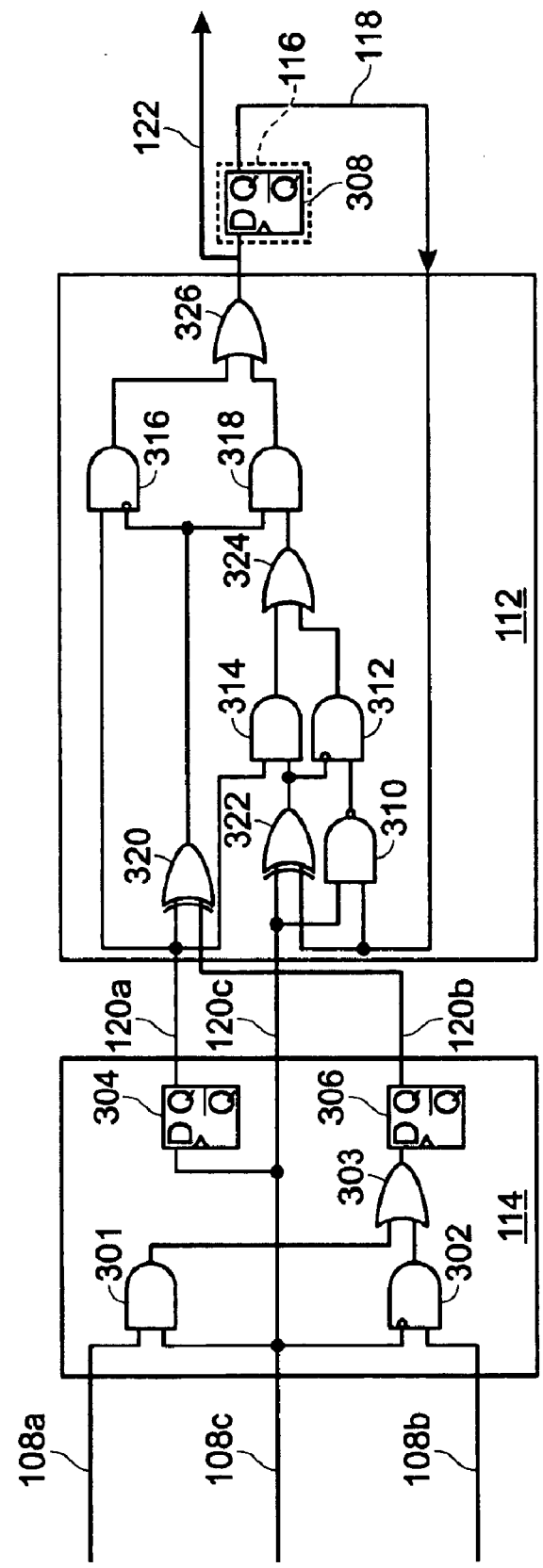
FIG. 8 is a schematic block diagram of the non-causal circuit of FIG. 4 in greater detail.

FIG. 8 is a schematic block diagram of the non-causal circuit 110 of FIG. 4 in greater detail. FIG. 8 represents only one of many designs that can be used to embody the invention. The future decision circuit 114 has inputs connected to the outputs of the first, second, and third comparators of the multi-threshold circuit on lines 108a, 108b, and 108c, respectively. These three lines correspond to the thresholds shown in FIG. 5. The future decision circuit 114 passes the third comparator signal through on line 120c. This signal is called the third bit value. The future decision circuit 114 performs AND and OR operations using AND circuit 301, AND circuit 302, and OR circuit 303. Delays of one clock cycle are added using flip-flops 304 and 306. When the NRZ data stream input is less than V0, the estimates on line 120a and 120b are "0,0", respectively. When the NRZ data stream input is between Vopt and V0, the estimates on lines 120a and 120b are "0,1", respectively. When the NRZ data stream input is between Vopt and V1, the estimates on lines 120a and 120b are "1,0", respectively. When the NRZ data stream input is above V1, the estimates are lines 120a and 120b are "1,1", respectively. The combination of lines 120a and 120b is called the first bit estimate.

The past decision circuit 116 delays the first bit value on line 122 one clock cycle to supply the second bit value on line 118. Again, a D flip-flop 308 is used for the delay.

The present decision circuit 112 has inputs connected to the future decision circuit outputs to accept the first bit estimate and third bit, value on lines 120a, 120b, and 120c, respectively. The present decision circuit 112 supplies a first bit value by comparing the first bit estimate to situations when the second and third bit decision values are both "1", when the second and third bit value decisions are both "0", and when only one of the second and third bit value decisions is a "1". To accomplish these above-stated goals, AND circuits 310 through 318 are employed. Note that AND circuits 316 and 318 have one inverted input and that 310 has an inverted output (NAND). Also used are OR and XOR gates 320 through 326. Again, alternate circuit designs can accomplish the same functions. More important is the relationship between the signal inputs and signal outputs. FIG. 9 is a diagram of the truth table associated with the non-causal circuit of FIG. 8. The non-causal circuit 110 of the present invention systems 100 can be implemented using many different combinations of circuits. More critical is the actual task performed. This task is more clearly defined in light of the truth table diagram.

The first four lines in the table illustrate the case where the NRZ data input, at a clock period associated with a first bit, is below V0. The first bit value is made in comparison to the four different combinations of the second and third bit values. Likewise, the second four lines in the table illustrate the case where the NRZ data input, at a clock period associated with a first bit, is above V0 and below Vopt. The third set of four lines in the table illustrates the case where the NRZ data input is above Vopt, but below V1. The last set of four lines in the table illustrates the case where the NRZ data input is above VI.

Functional Description

Returning to FIG. 4, in some aspects of the system 100, the NRZ input signal is buffered (not shown). The NRZ data signal is provided to the multiple threshold comparators 124 through 126. In some aspects of the system 100 circuits, not shown, a timing recovery circuit is used at the output of the comparators on lines 108a through 108c. The timing recovery circuit generates a clock and sample signal from the received data. The sample signal is synchronized to the center of the data bit. In this implementation, a method for offsetting the sample point is provided to compensate device or channel specific anomalies.

Figure 10:
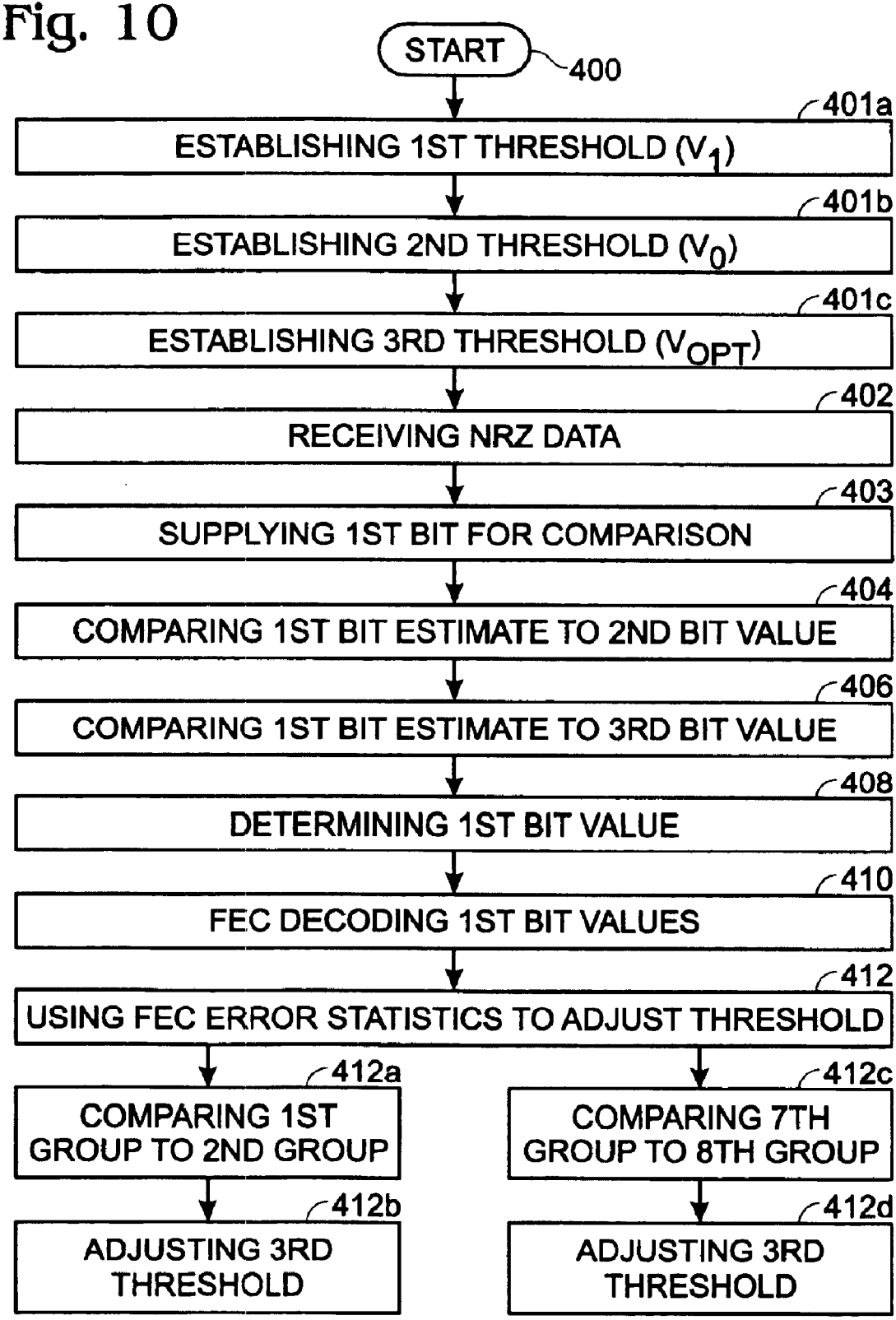
FIG. 10 is a flowchart illustrating the present invention method for non-causal channel equalization in a communications system using error statistics.

FIG. 10 is a flowchart illustrating the present invention method for non-causal channel equalization in a communications system using error statistics. This method generally corresponds to FIG. 4.

Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 400. Step 401 (not shown) generally establishes a plurality of thresholds to generate a first bit estimate. More specifically, Step 401a establishes a first threshold (V1) to distinguish a high probability "1" first bit estimate. Step 401b establishes a second threshold (V0) to distinguish a high probability "0" first bit estimate. Step 401c establishes a third threshold (Vopt) for first bit estimates between the first and second thresholds. Step 402 receives a non-return to zero (NRZ) data stream input with forward error correction (FEC). Step 403 supplies the first bit estimate for comparison in response to distinguishing the NRZ data stream input at the first, second, and third thresholds. Step 404 compares the first bit estimate in the data stream to a second bit value received prior to the first bit. Step 406 compares the first bit estimate to a third bit value received subsequent to the first bit. Step 408, in response to the comparisons, determines the value of the first bit.

In some aspects of the method, establishing a third threshold (Vopt) to distinguish first bit estimates between the first and second thresholds in Step 401c includes substeps. Step 401c1 (not shown) distinguishes NRZ data stream inputs below the first threshold and above the third threshold as a "0" if both the second and third bits are "1" values, as a "1" if only one of the second and third values is a "1" value, and as a "1" if both the second and third bits are a "0" value. Step 401c2 (not shown) distinguishes NRZ data stream inputs above the second threshold and below the third threshold as a "1" if both the second and third bits are a "0" value, as a "0" if only one of the second and third values is a "0" value, and as a "0" if both the second and third bits are a "1" value.

Step 410 FEC decodes the determined first bit values. Step 412 uses FEC error statistics to adjust the thresholds. That is, Step 412 evaluates the number of errors associated with a plurality of three-bit sequence combinations, where each sequence includes the second bit value, followed by the first (center) bit value, followed by the third bit value, and the error is in the first (center) bit value. In some aspects of the method, evaluating the number of errors associated with a plurality of three-bit sequence combinations includes comparing the number of errors between different groups of three-bit sequences.

In one example, using FEC error statistics to adjust the thresholds in Step 412 includes substeps. Step 412a compares the number of errors in a first group of three-bit sequences including 010, 011, and 110 to the number of errors in a second group of three-bit sequences including 000, 001, and 100. Step 412b adjusts the third threshold to balance the number of errors between the first group of three-bit sequences and the second group of three-bit sequences. In some aspects of the method, the first group of three-bit sequences additionally comprises 111 and the second group of three-bit sequences additionally comprises 101.

Alternately, using FEC error statistics to adjust the thresholds includes other substeps. Step 412c compares the number of errors in a seventh group of three-bit sequences including 010 and 110 to the number of errors in a eighth group of three-bit sequences including 101 and 100. Step 412d adjusts the third threshold to balance the number of errors between the seventh group of three-bit sequences and the eighth group of three-bit sequences.

In one aspect of the method Step 412 uses FEC error statistics to adjust the thresholds by adjusting the first threshold to balance the number of errors between a third group of three-bit sequences including 101 and 100 and the fourth group of three-bit sequences including 2×(1511). That is, the number of errors associated with the three-bit sequence 111 is doubled. In another aspect, Step 412 uses FEC error statistics to adjust the thresholds by adjusting the second threshold to balance the number of errors between a fifth group of three-bit sequences including 010 and 110 and the sixth group of three-bit sequences including 2×(000).

In some aspects, receiving a non-return to zero (NRZ) data stream input encoded with forward error correction (FEC) in Step 402 includes receiving a non-return to zero (NRZ) data stream input with an asymmetric noise distribution. Then, using FEC error statistics to adjust the thresholds in Step 412 includes offsetting the threshold adjustments to account for the asymmetric noise distribution.

In some aspects of the method, receiving a non-return to zero (NRZ) data stream input encoded with forward error correction (FEC) in Step 402 includes receiving a data stream organized in frames. Then, using FEC error statistics to adjust the thresholds in Step 412 includes analyzing error statistics on a frame-by-frame basis.

Evaluating the number of errors associated with a plurality of three-bit sequence combinations in Step 412 includes comparing different groups of three-bit sequences, where the first (center) bit value has been FEC corrected. In some aspects of the method, the first (center) and second bit values have been FEC corrected. In other aspects, the first (center) and third bit values have been FEC corrected.

FIG. 11 is a flowchart illustrating a different aspect of the non-causal channel equalization method of FIG. 10. The method starts at Step 500. Step 502 receives a non-return to zero (NRZ) data stream input encoded with forward error correction (FEC). Step 504 establishes a first (V1), second (V0), and third (Vopt) threshold to generate a first bit estimate. Step 506 FEC decodes determined bit values. Step 508 analyzes sequences of bit values. Step 510 uses FEC error statistics of the sequences to adjust the thresholds.

A system and method have been provided for non-causally adjusting a NRZ data stream channel using FEC error statistics. Because inter-symbol dispersion is a non-causal impairment, the estimation algorithms are more effective when based upon iteratively collected data. The degree of iteration affects the performance of the circuit and is selected based upon the implementation tradeoffs. It is expected that those skilled in the art could implement the collection of such data. Examples have been given of an NRZ modulation protocol, however, the principles of the present invention can be applied to other protocols where ISI is an issue. Examples have also been given of a three-threshold decision system. Once again, the principles of the present invention can be applied to systems using a different number of decision thresholds. Also, examples of the three-bit (future/present/past) non-causal decision circuit have been given. The present invention could also be applicable to a non-causal circuit that evaluates longer sequences of bit decision. Likewise, the invention could be enabled analyzing the statistics of longer bit sequences. Other variations and embodiments of the invention will occur to those skilled in the art.

We claim:

1. In a communications system, a method for non-causal channel equalization using error statistics, the method comprising:

receiving a non-return to zero (NRZ) data stream input encoded with forward error correction (FEC);

establishing a plurality of thresholds to generate a first bit estimate, including:
a first threshold (V1) to distinguish a high probability "1" first bit estimate;
a second threshold (V0) to distinguish a high probability "0" first bit estimate; and
a third threshold (Vopt) to distinguish first bit estimates between the first and second thresholds;

supplying the first bit estimate for comparison in response to distinguishing the NRZ data stream input at the first, second, and third thresholds;

comparing the first bit estimate in the data stream to a second bit value received prior to a first bit;

comparing the first bit estimate to a third bit value received subsequent to the first bit;

in response to the comparisons, determining the value of the first bit;

FEC decoding determined first bit values; and, using FEC error statistics to adjust the thresholds by evaluating a number of errors associated with different groups of three-bit sequences, where each sequence includes the second bit value, followed by the first (center) bit value, followed by the third bit value, and the error is in the first (center) bit value.

2. The method of claim 1 wherein establishing a third threshold (Vopt) to distinguish first bit estimates between the first and second thresholds includes:

distinguishing NRZ data stream inputs below first threshold and above the third threshold as a "0" if both the second and third bits are "1" values, as a "1" if only one of the second and third bits is a "1" value, and as "1" if both the second and third bits are a "0" value;

distinguishing NRZ data stream inputs above the second threshold and below the third threshold as a "1" if both the second and third bits are a "0" value, as a "0" if only one of the second and third values is a "0" value, and as a "0" if both the second and third bits are a "1" value; and, wherein using FEC error statistics to adjust the thresholds includes:

comparing the number of errors in a first group of three-bit sequences including 010, 011, and 110 to the number of errors in a second group of three-bit sequences including 000, 001, and 100; and, adjusting the third threshold to balance the number of errors between the first group of three-bit sequences and the second group of three-bit sequences.

3. The method of claim 2 wherein comparing the number of errors in a first group of three-bit sequences to the number of errors in a second group of three-bit sequences includes the first group of three-bit sequences additionally comprising 111 and the second group of three-bit sequences additionally comprising 101.

4. The method of claim 3 wherein using FEC error statistics to adjust the thresholds includes adjusting the first threshold to balance the number of errors between a third group of three-bit sequences including 101 and 100 and a fourth group of three-bit sequences including 2×(111).

5. The method of claim 4 wherein using FEC error statistics to adjust the thresholds includes adjusting the second threshold to balance the number of errors between a fifth group of three-bit sequences including 010 and 110 and a sixth group of three-bit sequences including 2×(000).

6. The method of claim 5 wherein comparing the number of errors between different groups of three-bit sequences includes comparing different groups of three-bit sequences, where the first (center) and second bit values have been FEC corrected.

7. The method of claim 1 wherein establishing a third threshold (Vopt) to distinguish first bit estimates between the first and second thresholds includes:

distinguishing NRZ data stream inputs below first threshold and above the third threshold as a "0" if both the second and third bits are "1" values, as a "1" if only one of the second and third bits is a "1" value, and as "1" if both the second and third bits are a "0" value;

distinguishing NRZ data stream inputs above the second threshold and below the third threshold as a "1" if both the second and third bits are a "0" value, as a "0" if only one of the second and third values is a "0" value, and as a "0" if both the second and third bits are a "1" value; and, wherein using FEC error statistics to adjust the thresholds includes:

comparing the number of errors in a seventh group of three-bit sequences including 010 and 110 to the number of errors in a eighth group of three-bit sequences including 101 and 100; and, adjusting the third threshold to balance the number of errors between the seventh group of three-bit sequences and the eighth group of three-bit sequences.

8. The method of claim 7 wherein comparing the number of errors between different groups of three-bit sequences includes comparing different groups of three-bit sequences, where the first (center) and second bit values have been FEC corrected.

9. The method of claim 1 wherein receiving a non-return to zero (NRZ) data stream input encoded with forward error correction (FEC) includes receiving a data stream organized in frames; and, wherein using FEC error statistics to adjust the thresholds includes analyzing error statistics on a frame-by-frame basis.

10. The method of claim 1 wherein evaluating the number of errors associated with a plurality of three-bit sequence combinations includes comparing different groups of three-bit sequences, where the first (center) bit value has been FEC corrected.

11. The method of claim 1 wherein evaluating the number of errors associated with a plurality of three-bit sequence combinations includes comparing different groups of three-bit sequences, where the first (center) and second bit values have been FEC corrected.

12. The method of claim 1 wherein evaluating the number of errors associated with a plurality of three-bit sequence combinations includes comparing different groups of three-bit sequences, where the first (center) and third bit values have been FEC corrected.

13. A non-causal channel equalization communication system using error statistics, the system comprising:

a multi-threshold decision circuit having an input to accept a non-return to zero (NRZ) data stream encoded with forward error correction (FEC), an input to accept threshold values, and outputs to provide bit estimates responsive to a plurality of voltage threshold levels;

a non-causal circuit having inputs to accept bit estimates from the multi-threshold decision circuit, the non-causal circuit comparing a current bit estimate to bit value decisions made across a plurality of clock cycles, the non-causal circuit having an output to supply a bit value for the current bit estimate determined in response to the non-causal bit value comparisons, wherein the non-causal circuit includes:

a future decision circuit having inputs connected to the muti-threshold circuit outputs, the future decision circuit having outputs to supply a first bit estimate and a third bit value;

a present decision circuit having inputs to accept the first bit estimate, the third bit value, and a second bit value, the present decision circuit comparing the first bit estimate to both the second bit value, received prior to the first bit estimate, and the third bit value, received subsequent to the first bit estimate, the present decision circuit having an output to supply a first (center) bit value determined in response to comparing the first bit estimates to the second and third bit values;

a past decision circuit having an input to accept the first bit value and an output to supply the second bit value;

a forward error correction (FEC) circuit having an input to receive the first bit value from the non-causal circuit, the FEC circuit decoding the incoming data stream and correcting bit values in response to the decoding, the FEC circuit having an output to supply a stream of corrected data bits; and, a statistics circuit having an input to accept the first bit value from the non-causal circuit, an input to accept the stream of corrected data bits from the FEC circuit, and an output to supply threshold values to the multi-threshold circuit in response to analysis of FEC error statistics, wherein the statistics circuit adjusts threshold values in response to evaluating the number of errors associated with a plurality of three-bit sequence combinations, where each sequence includes the second bit value, followed by the first (center) bit value, followed by the third bit value, and the error is in the first (center) bit value.

14. The system of claim 13 wherein the multi-threshold circuit includes:

a first comparator having an input to accept the NRZ data stream, an input establishing a first threshold (VI), and an output to supply a signal distinguishing when the NRZ data stream input has a high probability of being a "1" bit value;

a second comparator having an input to accept the NRZ data stream, an input establishing a second threshold (V0), and an output to supply a signal distinguishing when the NRZ data stream input has a high probability of being a "0" bit value;

a third comparator having an input to accept the NRZ data stream, an input establishing a third threshold (Vopt), and an output to provide a signal when the NRZ data stream input has an approximately equal probability of being a "0" value as a "1" value; and, wherein the statistics circuit adjusts threshold values in response to comparing a number of errors between different groups of three-bit sequences.

15. The system of claim 14 wherein the future decision circuit supplies a first bit estimate for an NRZ data stream input below the third threshold and above the second threshold;

wherein the present decision circuit, in response, supplies:

a first bit value of "1" if both the second and third bit value are "0" values;

a first bit value of "0" if only one of the second and third bit values is a "0" value;

a first bit value of "0" if both the second and third bit values are a "1"; and, wherein the statistics circuit compares the number of errors in a first group of three-bit sequences including 010, 011, and 110 to the number of errors in a second group of three-bit sequences including 000, 001, and 100, and adjusts the third threshold to balance the number of errors between the first group of three-bit sequences and the second group of three-bit sequences.

16. The system of claim 15 wherein the statistics circuit compares the number of errors in a first group of three-bit sequences to the number of errors in a second group of three-bit sequences, with the first group of three-bit sequences additionally comprising 111 and the second group of three-bit sequences additionally comprising 101.

17. The system of claim 16 wherein the statistics circuit adjusts the first threshold to balance the number of errors between a third group of three-bit sequences including 101 and 100 and a fourth group of three-bit sequences including 2×(111).

18. The system of claim 17 wherein the statistics circuit adjusts the second threshold to balance the number of errors between a fifth group of three-bit sequences including 010 and 110 and a sixth group of three-bit sequences including 2×(000).

19. The system of claim 18 wherein the statistics circuit adjusts threshold values in response to comparing the number of errors between different groups of three-bit sequences, where the first (center) and second bit values have been FEC corrected.

20. The system of claim 14 wherein the multi-threshold circuit includes:

a first comparator having an input to accept the NRZ data stream, an input establishing a first threshold (V1), and an output to supply a signal distinguishing when the NRZ data stream input has a high probability of being a "1" bit value;

a second comparator having an input to accept the NRZ data stream, an input establishing a second threshold (V0), and an output to supply a signal distinguishing when the NRZ data stream input has a high probability of being a "0" bit value;

a third comparator having an input to accept the NRZ data stream, an input establishing a third threshold (Vopt), and an output to provide a signal when the NRZ data stream input has an approximately equal probability of being a "0" value as a "1" value; and, wherein the statistics circuit compares the number of errors in a seventh group of three-bit sequences including 010 and 110 to the number of errors in a eighth group of three-bit sequences including 101 and 100, and adjusts the third threshold to balance the number of errors between the seventh group of three-bit sequences and the eighth group of three-bit sequences.

21. The system of claim 20 wherein the statistics circuit adjusts threshold values in response to comparing the number of errors between different groups of three-bit sequences, where the first (center) and second bit values have been FEC corrected.

22. The system of claim 14 wherein the multi-threshold circuit receives a NRZ data stream input organized in frames; and, wherein the statistics circuit analyzes error statistics on a frame-by-frame basis.

23. The system of claim 14 wherein the statistics circuit adjusts threshold values in response to comparing the number of errors between different groups of three-bit sequences, where the first (center) bit value has been FEC corrected.

24. The system of claim 14 wherein the statistics circuit adjusts threshold values in response to comparing the number of errors between different groups of three-bit sequences, where the first (center) and second bit values have been FEC corrected.

25. The system of claim 14 wherein the statistics circuit adjusts threshold values in response to comparing the number of errors between different groups of three-bit sequences, where the first (center) and third bit values have been FEC corrected.

26. In a communications system, a method for non-causal channel equalization using error statistics, the method comprising:

receiving a digital data stream input encoded with forward error correction (FEC);

establishing a plurality of thresholds to generate a first bit estimate, including:

a first threshold (V1) to distinguish a high probability "1" first bit estimate;

a second threshold (V0) to distinguish a high probability "0" first bit estimate;

a third threshold (Vopt) to distinguish first bit estimates between the first and second thresholds;

supplying the first bit estimate for comparison in response to distinguishing the digital data stream input at the first, second, and third thresholds;

comparing the first bit estimate in the data stream to a second bit value received prior to a first bit;

comparing the first bit estimate to a third bit value received subsequent to the first bit;

in response to the comparisons, determining the value of the first bit;

FEC decoding determined first bit values; and, using FEC error statistics to adjust the thresholds by evaluating a number of errors associated with different groups of three-bit sequences, where each sequence includes the second bit value, followed by the first bit value, followed by the third bit value, and the error is in the first bit value.

27. A non-causal channel equalization communication system using error statistics, the system comprising:

a multi-threshold decision circuit having an input to accept a digital data stream encoded with forward error correction (FEC), an input to accept threshold values, and outputs to provide bit estimates responsive to a plurality of voltage threshold levels;

a non-causal circuit having inputs to accept bit estimates from the multi-threshold decision circuit, the non-causal circuit comparing a current bit estimate to bit value decisions made across a plurality of clock cycles, the non-causal circuit having an output to supply a bit value for the current bit estimate determined in response to the non-causal bit value comparisons, wherein the non-causal circuit includes:

a future decision circuit having inputs connected to the mutli-threshold circuit outputs, the future decision circuit having outputs to supply a first bit estimate and a third bit value;

a present decision circuit having inputs to accept the first bit estimate, the third bit value, and a second bit value, the present decision circuit comparing the first bit estimate to both the second bit value, received prior to the first bit estimate, and the third bit value, received subsequent to the first bit estimate, the present decision circuit having an output to supply a first bit value determined in response to comparing the first bit estimates to the second and third bit values;

a past decision circuit having an input to accept the first bit value and an output to supply the second bit value;

a forward error correction (FEC) circuit having an input to receive the first bit value from the non-causal circuit, the FEC circuit decoding the incoming data stream and correcting bit values in response to the decoding, the FEC circuit having an output to supply a stream of corrected data bits; and, a statistics circuit having an input to accept the first bit value from the non-causal circuit, an input to accept the stream of corrected data bits from the FEC circuit, and an output to supply threshold values to the multi-threshold circuit in response to analysis of FEC error statistics, wherein the statistics circuit adjusts threshold values in response to evaluating the number of errors associated with a plurality of thee-bit sequence combinations, where each sequence includes the second bit value, followed by the first bit value, followed by the third bit value, and the error is in the first bit value.

* * * * *